United States Patent [19]
Kim et al.

[11] Patent Number: 5,442,703
[45] Date of Patent: Aug. 15, 1995

[54] METHOD FOR IDENTIFYING CORRUPT ENCRYPTION KEYS WITHIN A SECURE COMMUNICATION SYSTEM

[75] Inventors: Charles C. Kim, Mount Prospect; Robert D. Woodhouse, Elgin, both of Ill.

[73] Assignee: Motorola, Inc., Schaumburg, Ill.

[21] Appl. No.: 250,318

[22] Filed: May 27, 1994

Related U.S. Application Data

[63] Continuation of Ser. No. 129,508, May 30, 1993, abandoned.

[51] Int. Cl.6 .............................................. H04L 9/00
[52] U.S. Cl. ......................................... 380/21; 380/2; 380/9; 380/49
[58] Field of Search ....................... 380/2, 4, 9, 21, 43, 380/49, 50

[56] References Cited

U.S. PATENT DOCUMENTS

| | | | |
|---|---|---|---|
| 4,176,246 | 11/1979 | Gaetzi | 380/43 |
| 4,182,933 | 1/1980 | Rosenblum | 380/21 |
| 4,876,716 | 10/1989 | Okamoto | 380/21 |
| 4,881,263 | 11/1989 | Herbison et al. | 380/21 |
| 4,924,513 | 5/1990 | Herbison et al. | 380/21 |
| 5,081,678 | 1/1992 | Kaufman et al. | 380/21 |
| 5,136,642 | 8/1992 | Kawamura et al. | 380/21 |
| 5,193,114 | 3/1993 | Moseley | 380/49 X |
| 5,222,137 | 6/1993 | Barrett et al. | 380/21 |

*Primary Examiner*—Bernarr E. Gregory
*Attorney, Agent, or Firm*—Christopher P. Moreno; Timothy W. Markison; Wayne J. Egan

[57] ABSTRACT

A resource allocator (108) receives, from a first communication unit, a request to establish secure communications with at least a second communication unit. A key identifier is retrieved by the resource allocator and transmitted to at least the second communication unit. Based upon the transmitted key identifier, the second communication unit retrieves an identified encryption key and, at least when the identified encryption key is corrupt, transmits a corrupt key indication to the resource allocator. In response, the resource allocator can assign a default key identifier for use in the secure communication. In this manner, missed communications due to encryption key failures are reduced.

8 Claims, 3 Drawing Sheets

METHOD FOR IDENTIFYING CORRUPT ENCRYPTION KEYS WITHIN A SECURE COMMUNICATION SYSTEM

This is a continuation of application Ser. No. 08/129,508, filed May 30, 1993 and now abandoned.

FIELD OF THE INVENTION

The present invention relates generally to secure communications systems and, in particular, to a method for establishing communications therein.

BACKGROUND OF THE INVENTION

Secure trunking communication systems are known to comprise a resource allocator, a plurality of communication units, broadcast units that transceive a limited number of communication resources, a console(s) and corresponding console interface unit(s). Furthermore, a single, system-wide encryption key is often used, by the communication units and the console interface units, to provide secure communications within such systems. As the needs of users of secure trunking communication systems have expanded, the availability of multiple encryption keys for use in communications has become a desirable system feature. The provision of multiple encryption keys within secure trunking systems, however, does not decrease the likelihood of failed encryption keys within communication units and console interface units.

An encryption key, typically stored in volatile memory such as RAM (random-access memory), can fail as a result of corruption of the key, loss of any portion of the key, or any other circumstance that renders the key unusable for secure communications. Within multiple key systems, particular keys are often associated with groups of communication units, referred to as talkgroups. If a particular key fails within a console interface unit(s), the console(s) within the system may be unable to communicate securely with the corresponding talkgroup. Likewise, failure of a particular key within a communication unit prevents that unit from participating in the corresponding talkgroup's secure communications. Assuming that an operator receives notification of a key failure, one solution to this problem is to switch to an unencrypted communications mode. Of course, this solution is contrary to the need for secure communications and is generally unacceptable.

Another solution might require the user to select a different talkgroup and hence, a different key. An undesirable side-effect of this solution is that the second talkgroup may include parties not originally intended to receive the communication, leaving the possibility for compromised security. Therefore, a need exists for a method that allows secure communications to be established despite the occurrence of a key failure and that does not create a potential loss of security.

DESCRIPTION OF A PREFERRED EMBODIMENT

Generally, the present invention provides a method for establishing communication in a secure communication system. This is accomplished by either a communication unit or a console (via a console interface unit (CIU)) transmitting, to a resource allocator, a request for a secure communication with a talkgroup. The resource allocator chooses a communication resource, based in part upon availability, and an encryption key, based on the requested talkgroup, for the communication. An indication of the chosen communication resource and a key identifier are transmitted, by the resource allocator, to at least the requesting unit or CIU. If the identified encryption key is corrupt in the requesting unit or CIU, a corrupt key indication is transmitted to the resource allocator by the requesting unit or CIU. Upon reception of the corrupt key indication, the resource allocator can assign a default key, or, in the case that a CIU has a corrupt key, an alternate CIU. With such a method, secure communications are more reliably established.

Figure 1:
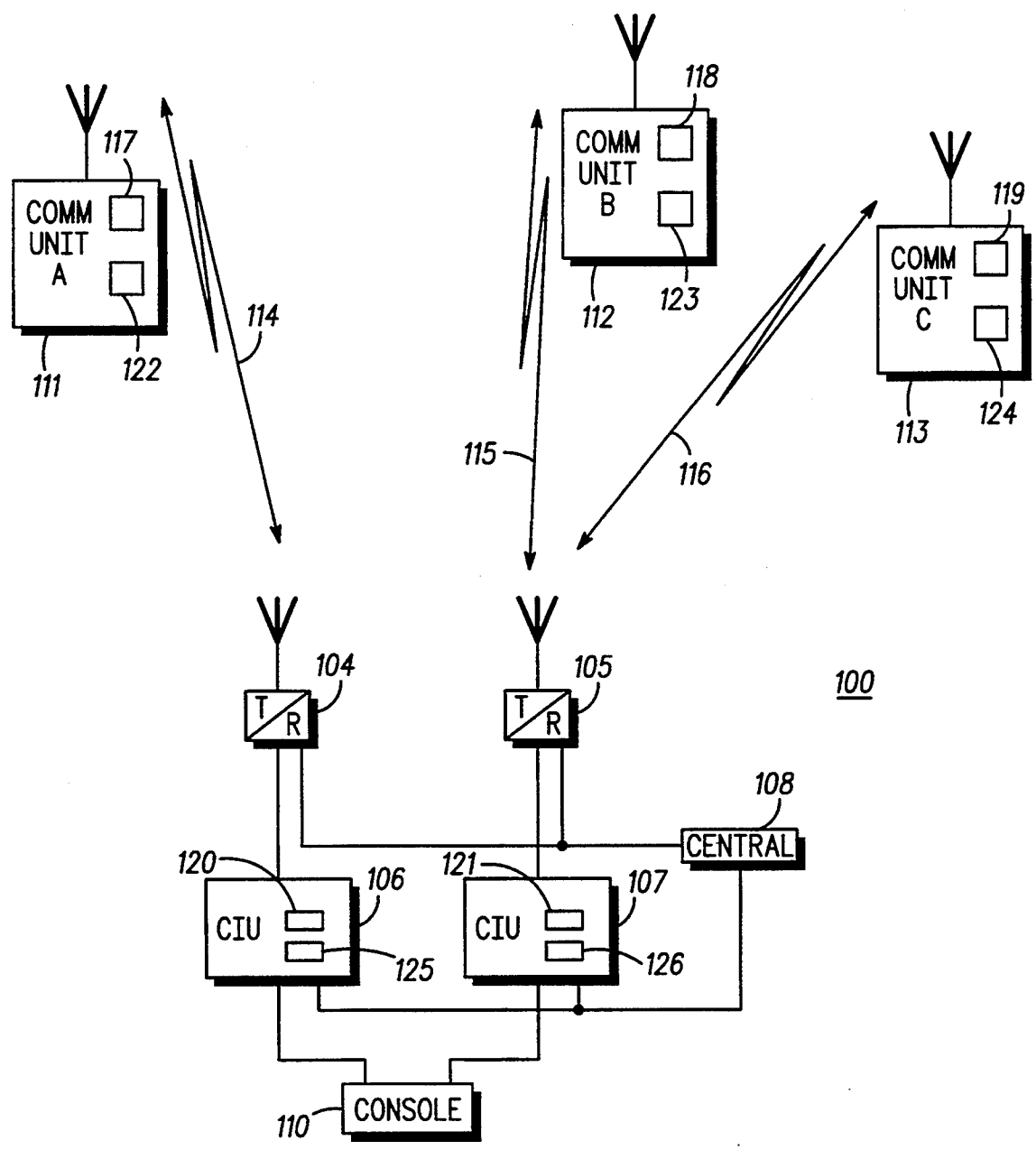
FIG. 1 illustrates a secure trunking communication system in accordance with the present invention.

The present invention can be more fully described with reference to FIG.'S 1-3. FIG. 1 illustrates a secure communication system (100) that includes broadcast units (104, 105), CIUs (106, 107), a resource allocator (108), a console (110), communication units (111-113), communication resources (114-116), encryption/decryption devices (117-121), and memory devices (122-126). The broadcast units (104-105) may comprise a base station or repeater, such as an MSF5000 by Motorola Inc.

The CIUs (106, 107), which provide an interface between the console (110) and the broadcast units (104, 105) and also perform secure encoding/decoding functions using encryption keys specified by the resource allocator (108), may be Series II Console Interface Units as manufactured by Motorola Inc. The console (110) consists of one or more dispatcher positions and an audio router such as a CENTRACOM Series II by Motorola Inc. The dispatcher position(s) includes controls for each communication resource (114-116), which may be multiple radio frequency (RF) channels such as pairs of frequency carriers, time division multiplex (TDM) slots, or any other RF transmission media.

The communication units (102-103) may be portable and/or mobile radios that include encryption/decryption devices (117-119) and memory devices (122-124). The memory devices (122-126), which may be RAM, ROM (read-only memory), EEPROM (electronically-erasable, programmable, read only memory), or any other means for storing digital information, are used to store encryption key variables and identifiers, including at least a default key and default key identifier. Similar to the memory devices (122-126), a database (not shown), containing the encryption key identifiers (including the default key identifier), is included in the resource allocator (108).

Normally, an initiator of a call selects a talkgroup to receive a secure communication and loads, into an encryption/decryption device (117-121), an encryption key associated with the selected talkgroup. Destination units in the secure communication receive a key identifier from the resource allocator (108) based on the talkgroup selected by the call initiator. The destination units use the key identifier to retrieve the identified encryption key and load it into an encryption/decryption device (117–121).

In the event that the identified encryption key retrieved in a CIU (120–121) is corrupt, and consequently fails, the console (110) will not be able to participate in the secure communication. If it happens that the identified encryption key in one or more of the communication units (111–113) fails, those communication units (111–113) with the failed key will not be able to participate in the secure communication.

Figure 2:
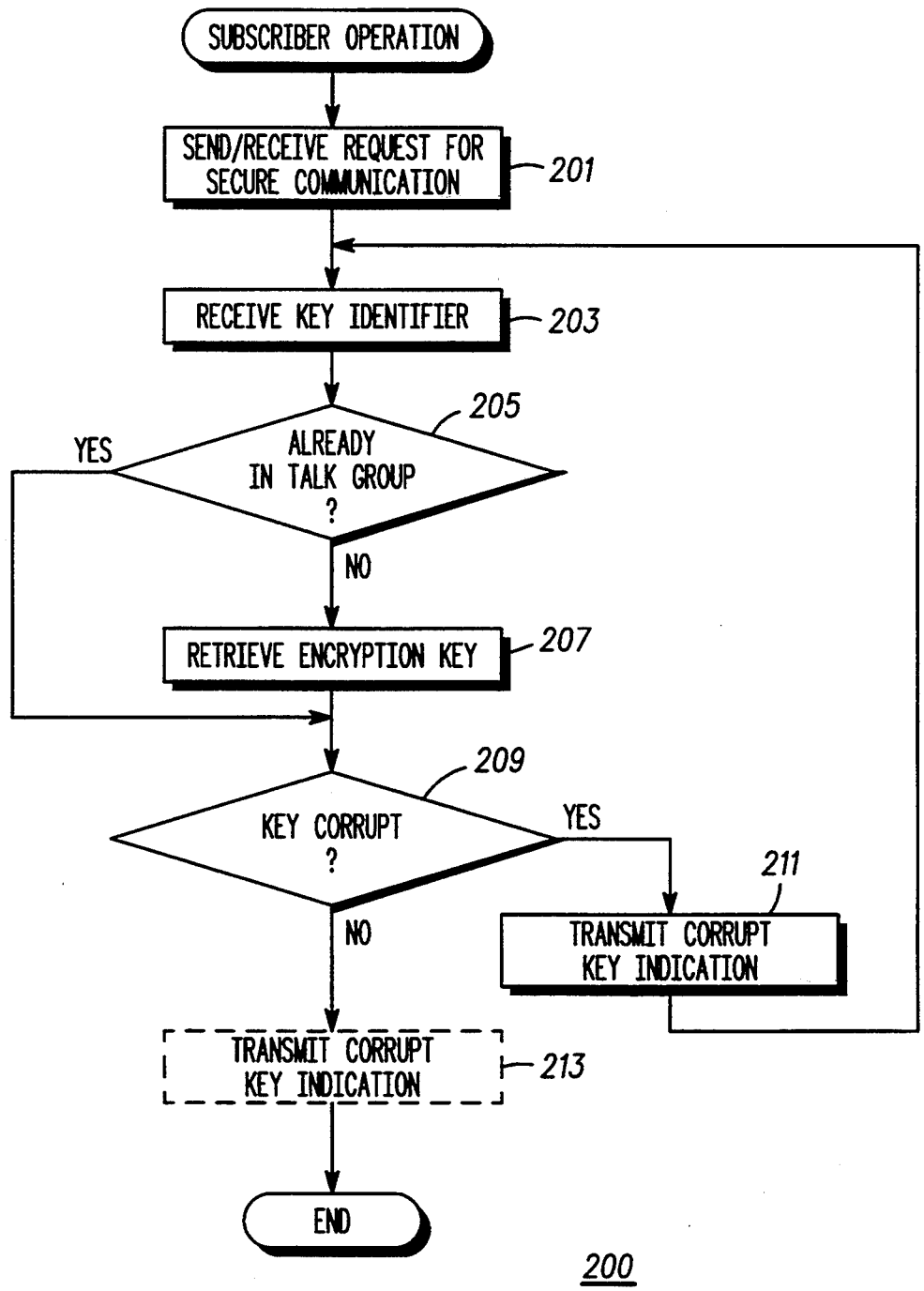
FIG. 2 illustrates a logic diagram which may be incorporated by a communication unit to implement the present invention.

FIG. 2 illustrates a logic diagram (200) that a subscriber (i.e., communication unit (111–113) or console (110) operating in conjunction with CIU (106–107)) may incorporate to implement the present invention. At step 201, a first communication unit may send a request for a secure communication to the resource allocator (108). In the event that the initiating and target subscriber are communication units (111–113), the request is typically an ISW including at least a talkgroup ID associated with the target or second communication unit. It is also possible that the "target" subscriber is the console (110), in conjunction with a CIU (106–107), that is monitoring communications within a talkgroup. In either situation, the resource allocator (108) selects an encryption key for the secure communication and transmits a key identifier to the second communication unit. The key identifier allows the correct key to be identified and retrieved by the second communication unit and may be, for example, a talkgroup ID—if the key is slaved to a talkgroup, a communication resource assignment—if the key is slaved to a communication resource, or, as in a preferred embodiment, a key reference index that simply assigns a numerical index to each key. Note that in the event the second communication unit is the console (110), the resource allocator (108) assigns a CIU (106–107) to the console (110) and sends the key identifier to the assigned CIU (106–107).

Upon receiving the key identifier (203), the second communication unit determines (205) if retrieval of the encryption key is necessary. In a preferred embodiment, a communication unit currently operating within the talkgroup before the secure communication begins will have already retrieved the encryption key for that talkgroup, and thus will not retrieve the key from memory (122–126). Otherwise, the identified encryption key, based at least in part on the key identifier, is retrieved (207). A communication unit scanning for activity among a number of talkgroups may need to retrieve the encryption key for the talkgroup targeted for the secure communication.

The encryption key is tested (209) to determine whether or not the encryption key is corrupt (i.e., indicating a key failure). In a preferred embodiment, checksum data stored with the key indicates whether or not the key is corrupt. That is, a checksum is calculated over the key being tested and, if the calculated checksum does not match the stored checksum, the key is assumed to be corrupted. If the key is corrupted in the second communication unit, the unit transmits a corrupt key indication, indicating that the key has become corrupt, to the resource allocator (108), and the process resumes at step 203 with the receipt of another key identifier. If the key is not corrupt, a corrupt key indication, indicating that the key is not corrupted, may optionally be sent (213) to the resource allocator (108). This optional step (213) may be useful in communication systems using fixed, "over-the-air" communication protocols.

Figure 3:
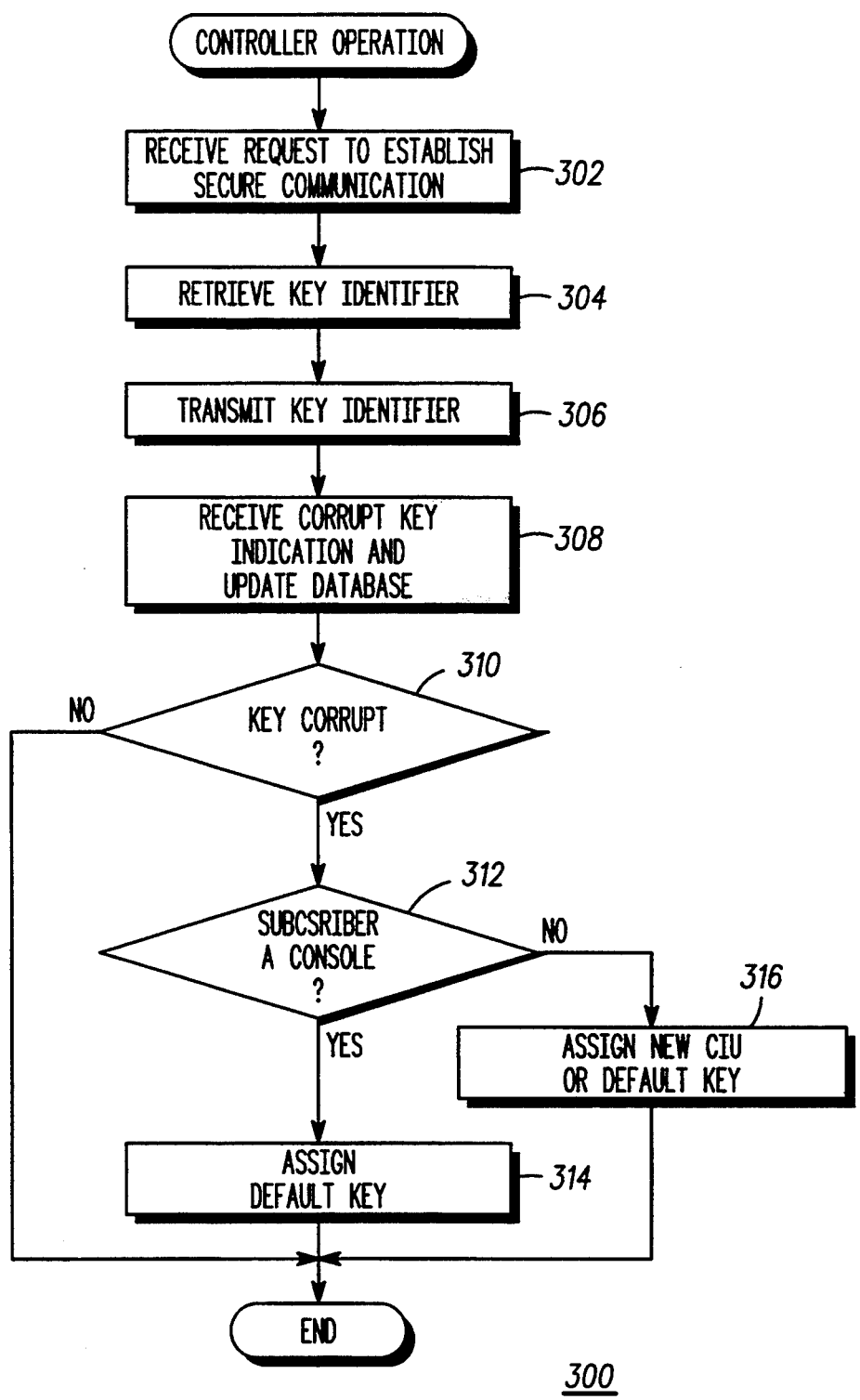
FIG. 3 illustrates a logic diagram which may be incorporated by a resource allocator to implement the present invention.

FIG. 3 illustrates a logic diagram (300) that a resource allocator may incorporate to implement the present invention. At step 302, the resource allocator (108) receives, from a first communication unit, a request for a secure communication with at least a second communication unit. As mentioned previously, at least part of the request identifies the intended audience or talkgroup. Responsive to the request, the resource allocator (108) refers to its database to find a key identifier (304) associated with the intended audience or talkgroup targeted for the secure communication. For example, if the intended audience is a CIU (106–107) and console (110), the key identifier might be a key reference index. In the event that the intended audience is a talkgroup, for instance, the key identifier might be a talkgroup ID.

At step 306, the resource allocator (108) transmits the key identifier to the second communication unit. When the resource allocator (108) receives a corrupt key indication (308), the corrupt key indication is stored to the database. A decision (310) is then reached, where it is determined whether or not the identified encryption key in the second communication unit has been corrupted. If the key is not corrupted, no further processing is required. If the corrupt key indication indicates a corrupt key, special action is taken. It should be noted that in either case, the resource allocator (108) maintains a database of communication units possessing failed keys. In this manner, the resource allocator (108) can avoid assigning corrupt keys to those communication units and the resource allocator (108) can quickly assign a default key identifier, as later described, if the database indicates that a communication unit has a corrupt key.

Upon detection of a corrupt key, the resource allocator (108) determines whether the corrupt key is located in a communication unit (111–113) or a CIU (106–107). If the corrupt key is in a CIU (106–107), the resource allocator (108) may select (316) an alternate CIU, or assign a default key identifier as the key identifier. If an alternate CIU is selected, the alternate CIU is sent the key identifier for the secure communication, and any communication units (111–113) included in the secure communication are informed of the new communication resource (114–116) corresponding to the alternate CIU.

Alternatively, the default key identifier could be assigned as the key identifier. The default key identifier identifies, throughout the entire communication system (100), a default key. Since the default key identifier is universally recognized within the system (100), communication units participating in the secure communication are guaranteed to be using the correct key. Similarly, if the corrupt key resides in a communication unit (111–113), the resource allocator (108) assigns the default key identifier (314) as the key identifier, which is subsequently sent to those communication units participating in the secure communication.

The present invention provides a method for establishing communication within a secure communication system. With such a method, the probability of compromised secure communications due to corrupt encryption keys is substantially eliminated. The selection of a default key or alternate console interface units in response to corrupt key indications reduces the complications to secure communications caused by key failures. Further, a database of previously received corrupt key indications facilitates the reassignment process.

We claim:

1. In a secure communication system that includes a plurality of communication units and a resource allocator for allocating a limited number of communication resources among the plurality of communication units, wherein the secure communication system uses encryption keys to provide secure communication among the plurality of communication units, a method for identifying when an encryption key is corrupt, the method comprising the steps of:

at the resource allocator;
- a) receiving, from a first communication unit, a request to establish a communication with at least a second communication unit;
- b) retrieving, from a database, a key identifier responsive to the request; and
- c) transmitting, to at least the second communication unit, the key identifier; at the second communication unit;
- d) retrieving, based at least in part on the key identifier, an identified encryption key; and
- e) transmitting a corrupt key indication to the resource allocator at least when the identified encryption key is corrupt.

2. The method of claim 1, wherein the secure communication system includes a plurality of console interface units, and wherein the second communication unit is associated with at least a first of the plurality of console interface units, the method further comprising the steps of:

at the resource allocator;
- f) receiving the corrupt key indication to produce a received corrupt key indication; and
- g) selecting, responsive to at least the received corrupt key indication, a second of the plurality of console interface units for association with the second communication unit.

3. The method of claim 1 wherein step b) comprises the step of identifying, responsive to the request and previously received corrupt key indications, a default key identifier as the key identifier.

4. The method of claim 1 wherein the plurality of communication units includes a plurality of mobile communication units, wherein the second communication unit is a first of the plurality of mobile communication units, and wherein step b) comprises the step of:
- b1) identifying a talkgroup ID that identifies a group of the plurality of communication units as the key identifier.

5. The method of claim 1 wherein the plurality of communication units includes a plurality of console interface units, wherein the second communication unit is associated with a first of the plurality of console interface units, and wherein step b) comprises the step of:
- b1) selecting a key reference index as the key identifier.

6. In a secure communication system that includes a plurality of communication units individually associated with a plurality of console interface units, and a resource allocator for allocating a limited number of communication resources among the plurality of communication units, wherein the secure communication system uses encryption keys to provide secure communication among the plurality of communication units, a method for reassociating a communication unit with a console interface unit when an encryption key is corrupt, the method comprising the steps of:

at the resource allocator;
- a) receiving, from a first communication unit, a request to establish a communication with at least a second communication unit, wherein the second communication unit is associated with a first of the plurality of console interface units;
- b) retrieving, from a database, a key identifier responsive to the request; and
- c) transmitting, to at least the second communication unit, the key identifier; at the second communication unit;
- d) receiving the key identifier to produce a received key identifier;
- e) retrieving, based at least in part on the received key identifier, an identified encryption key; and
- f) when the identified encryption key is corrupt, transmitting a corrupt key indication to the resource allocator; at the resource allocator;
- g) receiving the corrupt key indication to produce a received corrupt key indication; and
- h) selecting, responsive to at least the received corrupt key indication, a second of the plurality of console interface units for association with the second communication unit.

7. The method of claim 6 further comprising the steps of:

at the resource allocator;
- i) retransmitting, to at least the second communication unit, the key identifier;

at the second communication unit;
- j) retrieving, based at least in part on the key identifier, the identified encryption key; and
- k) when the identified encryption key is corrupt, transmitting the corrupt key indication to the resource allocator;

at the resource allocator;
- l) receiving the corrupt key indication to produce a second received corrupt key indication;
- m) identifying, responsive to the request, the second received corrupt key indication, and previous received corrupt key indications, a default key identifier as the key identifier, and;
- n) retransmitting, to at least the second communication unit, the key identifier.

8. The method of claim 6 wherein the plurality of communication units includes the plurality of console interface units, and wherein step b) comprises the step of:
- b1) selecting a key reference index as the key identifier.

* * * * *